Aug. 29, 1933.        G. J. MacFADDEN         1,924,326
              BEARING FOR ECCENTRICS
              Filed May 21, 1930      2 Sheets-Sheet 1
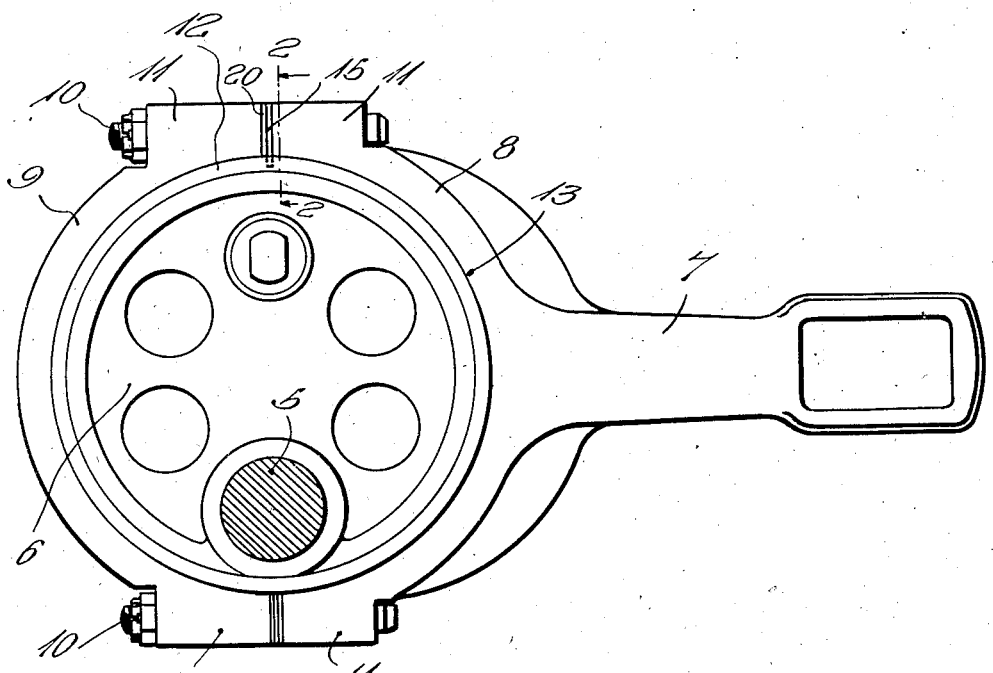
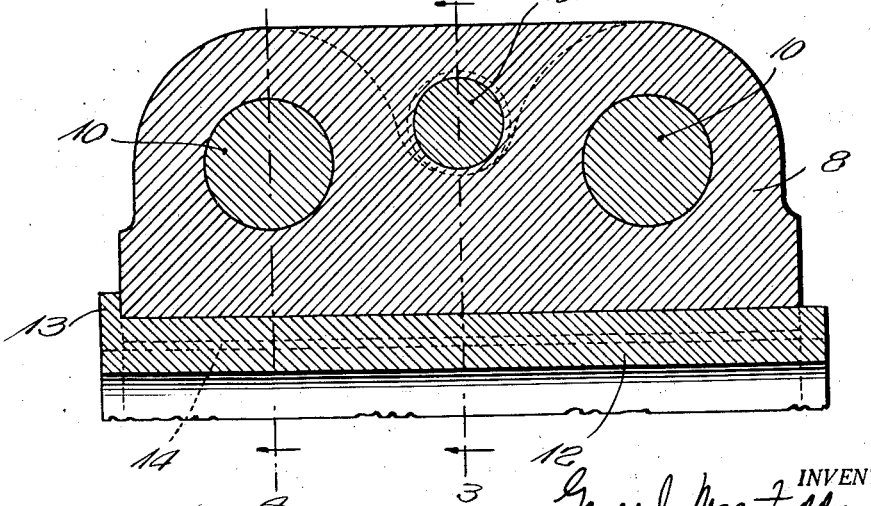
INVENTOR.
George J. MacFadden
BY
ATTORNEY.

Aug. 29, 1933.  G. J. MacFADDEN  1,924,326
BEARING FOR ECCENTRICS
Filed May 21, 1930    2 Sheets-Sheet 2
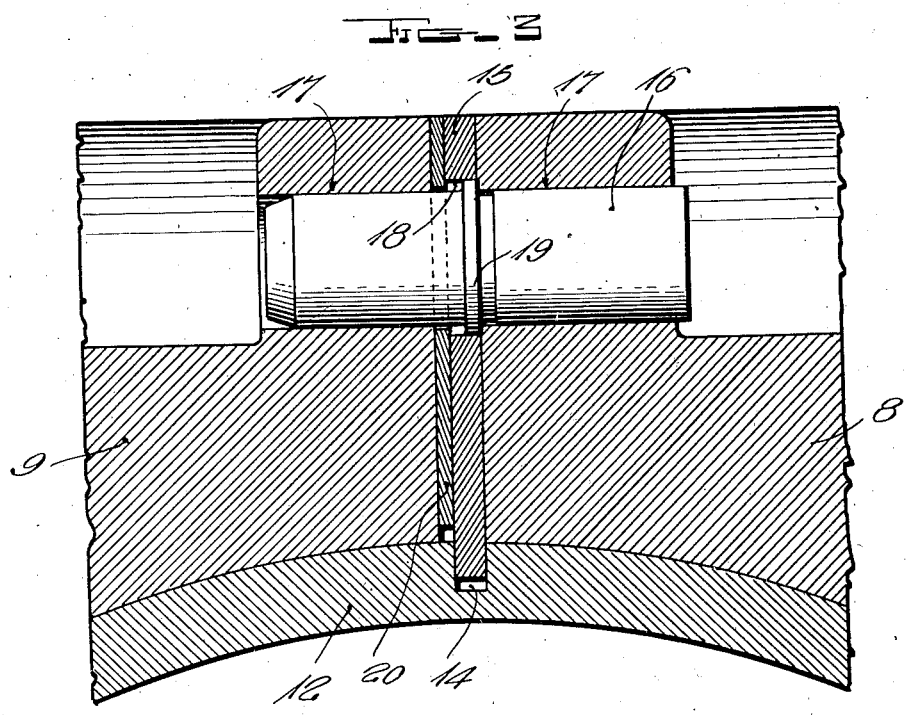
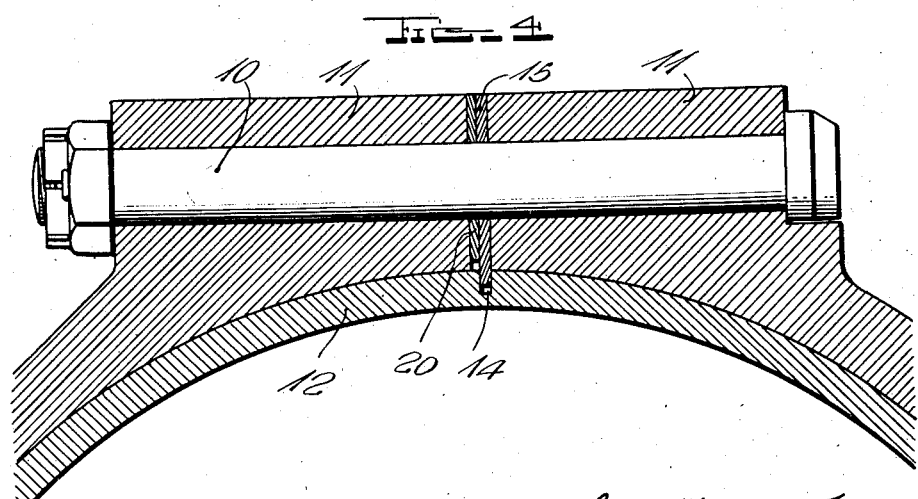
George J. MacFadden
INVENTOR.
BY
ATTORNEY.

Patented Aug. 29, 1933

1,924,326

UNITED STATES PATENT OFFICE 1,924,326

BEARING FOR ECCENTRICS

George J. MacFadden, Quincy, Ill., assignor to Gardner-Denver Company, Denver, Colo., a corporation of Delaware Application May 21, 1930. Serial No. 454,405

7 Claims. (Cl. 308—237)

The object of the present invention is to provide a bearing structure for a pitman or connecting rod in which a liner is employed, with novel means for holding the liner against displacement.

In the accompanying drawings:

Figure 1 is a side elevation of the general assembly of the preferred embodiment of the invention.

Figure 2 is a sectional view on the line 2—2 of Figure 1.

Figure 3 is a detail sectional view on the line 3—3 of Figure 2.

Figure 4 is a sectional view on the line 4—4 of Figure 2.

In the embodiment disclosed, the drive shaft is shown at 5 and carries an eccentric member 6. The connecting rod member is designated 7 and includes a ring that surrounds the eccentric member 6. This ring consists of a semi-circular section 8 integral with the connecting arm 7, and a semi-circular cap section 9 detachably fastened to the integral section 8 by bolts 10 passing through ears 11 on the respective ring sections.

Interposed between the eccentric member 6 and the ring 8—9 is a liner ring 12 preferably of one continuous piece. This liner ring has an outstanding retaining flange 13 on one or both sides that overlies the ring 8—9 of the connecting rod 7. It is also provided with a transverse slot 14 alined with one of the joints between the sections 8—9. Located in said joint and therefore interposed between the sections 8 and 9 is a holding-key plate 15 that extends inwardly beyond the ring 8—9 and is engaged in the slot or recess 14. This plate is held in place by the bolts that pass through the adjacent ears 11. There is also provided a retaining dowel pin 16 centrally located between the bolts 10 and fitted in sockets 17 formed in the central portions of the ears 11, which portions, as will be clear by comparing Figures 3 and 4, are narrower or shorter than the portions through which the bolts 10 pass. The opening 18 in the holding-key plate 14 through which the dowel 16 passes, is larger than the openings 17 and the dowel pin is provided with a peripheral flange 19 engaged in said opening 18. Shims 20 may be placed alongside the locking plate 15 and the dowel 16 will pass therethrough.

It has been found that in machining the connecting rod ring, it very frequently happens that either the rod section or the cap section will spring out of true after being bored and that the liner ring being a comparatively light member is not sufficiently rigid to overcome such distortion. The dowel pin 16 assures that the rod section and cap section when assembled are brought thereby into more nearly true relation. For this reason the dowel has a snug fit in both ring sections as distinguished from the tie bolts 10 which merely secure the sections together and have a relatively loose fit that cannot be relied on to maintain alignment.

The shoulder 19 of the dowel pin holds said pin securely in place after the assembly of the parts and the tapered end is to assure the entry of the pin into the socket 17 when being assembled as it allows for the initial distortion that may have taken place.

From the foregoing, it is thought that the construction, operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What I claim, is:

1. The combination with a rotatable eccentric member and a connecting rod member having a sectional ring surrounding the eccentric rod member, a liner ring interposed between the eccentric member and the rod member ring and having a recess, a holding key clamped between the sections of the rod member ring and engaged in the recess, and an alining device for the sections maintaining the key in operative position.

2. The combination with a rotatable eccentric member and a connecting rod member having a sectional ring surrounding the eccentric rod member, a liner ring interposed between the eccentric member and the rod member ring and having a recess, a holding key plate interposed between the sections of the rod member ring and engaged in the recess of the liner ring to prevent movement of the latter, bolts securing the sections together and passing through the ring, and an alining device engaged in the sections and passing through the key.

3. The combination with a rotatable eccentric member, of a connecting rod member including a sectional ring surrounding the eccentric member, means for securing the ring sections together, an alining device that bridges the joint between the sections and snugly engages in both, and a key supported by the alining device and engageable with the liner to prevent movement of the latter.

4. The combination with a rotatable eccentric member and a connecting rod member having a sectional ring surrounding the eccentric rod member, a liner ring interposed between the members and having a recess, means for securing the ring sections together, an alining device bridging the joint between the sections and snugly positioned in both, a holding key between the sections and receivable in the liner recess, a flange on the alining device supporting the key, and said flange coacting with the sections to prevent the movement of the device when the sections are secured together.

5. The combination with a rotatable eccentric member and a connecting rod member having a sectional ring surrounding the eccentric rod member, a liner ring interposed between the members and having a recess in its outer periphery, bolts for securing the ring sections together, an aligning device bridging the joint between the sections, a flange on the aligning device between the sections, and a liner retaining key positioned about the flange and receivable within the liner recess to prevent movement of the latter with respect to the sections.

6. The combination with a rotatable eccentric member and a connecting rod member having a sectional ring surrounding the eccentric rod member, a liner interposed between the members and having a recess in its outer periphery, bolts for securing the ring sections together, an aligning device bridging the joint between the sections, said device having an enlarged portion to prevent longitudinal movement of the device with respect to the sections, and a liner retaining key receivable within the liner recess and supported by the enlarged portion of the device to prevent rotary and lateral movement of the liner with respect to the sections.

7. The combination with a rotatable eccentric member and a connecting rod member having a sectional portion surrounding the eccentric rod member, a liner ring interposed between the members, an aligning device for the sections of the connecting rod member, means on the device for maintaining it in place when the sections are clamped together, and a liner retaining key supported by the aligning device and engageable with the liner ring to hold the latter against rotary and lateral movements.

GEORGE J. MacFADDEN.